United States Patent
Uwabo et al.

(10) Patent No.: US 6,391,139 B1
(45) Date of Patent: May 21, 2002

(54) METHOD OF MAKING A DISK CARTRIDGE COMPRISING AN IMPROVED MAGNETIC DISK MEDIUM

(75) Inventors: Tsuneo Uwabo, Hachiouji; Yoshihiro Okano; Eiichi Yoneyama, both of Atsugi; Yoshinori Tangi, Hachiouji, all of (JP)

(73) Assignee: Mitsumi Electric Co., Ltd., Tokyo (JP)

(*) Notice: Subject to any disclaimer, the term of this patent is extended or adjusted under 35 U.S.C. 154(b) by 0 days.

(21) Appl. No.: 09/644,017

(22) Filed: Aug. 22, 2000

Related U.S. Application Data

(62) Division of application No. 08/993,273, filed on Dec. 18, 1997, now Pat. No. 6,130,806.

(30) Foreign Application Priority Data

| Dec. 26, 1996 | (JP) | ......................... 2002-348686 |
| Dec. 27, 1996 | (JP) | ......................... 2002-351351 |
| Jan. 6, 1997 | (JP) | ......................... 2001-000350 |

(51) Int. Cl.$^7$ ............................. B32B 31/00; G11B 23/03
(52) U.S. Cl. ........................ 156/256; 428/65.3; 369/272
(58) Field of Search .................... 156/256; 360/133, 360/137; 428/65.3; 369/272

(56) References Cited

U.S. PATENT DOCUMENTS

| 3,756,535 A | 9/1973 | Miller ........................ 242/197 |
| 4,695,910 A | 9/1987 | Maruyama et al. ......... 360/133 |
| 4,704,649 A | 11/1987 | Oishi ........................ 360/133 |
| 4,814,926 A | 3/1989 | Gulbrandsen ............... 360/133 |
| 4,843,511 A | 6/1989 | Downey ...................... 360/133 |
| 4,958,249 A | 9/1990 | Kadokura et al. .......... 360/133 |
| 5,164,239 A | 11/1992 | Ozawa et al. ............... 360/133 |
| 5,226,033 A | 7/1993 | Takahashi ................... 369/290 |
| 5,498,456 A | 3/1996 | Ikebe et al. ................. 360/133 |
| 5,657,311 A | 8/1997 | Takahashi ................... 369/290 |
| 5,687,048 A | 11/1997 | Mizuta ....................... 360/133 |
| 5,708,547 A | 1/1998 | Oishi ......................... 360/133 |
| 5,793,583 A | 8/1998 | Oishi ......................... 360/133 |
| 5,987,004 A | 11/1999 | Suwabe ...................... 369/290 |

OTHER PUBLICATIONS

Japanese book entitled "The Whole of Floppy Disk Apparatus"; by Shoji Takahashi; published by CQ Publishing Co., Ltd., Jul. 10, 1990, p. 160.

*Primary Examiner*—Linda Gray
(74) *Attorney, Agent, or Firm*—Frishauf, Holtz, Goodman, Langer & Chick, P.C.

(57) ABSTRACT

A disk cartridge includes a jacket body having upper and lower shells for receiving a magnetic disk medium therethrough. Upper and lower liners are adhered to inner surfaces of the upper and lower shells for removing fine dust attracted to upper and lower surfaces of the magnetic disk medium. In addition, upper and lower head windows are provided in the upper and lower shells, respectively, for permitting magnetic heads to access the magnetic disk medium when the magnetic disk medium is inserted through the upper and lower shells of the jacket body. A distance $h_1$ is less than a distance $h_0$, where $h_1$ is the distance between said upper and said lower liners at a periphery of the upper and the lower head windows at least on an upstream side of the upper and the lower head windows with respect to a rotating direction of the magnetic disk medium, and $h_0$ is the distance between the upper and the lower liners in a remaining area.

1 Claim, 12 Drawing Sheets

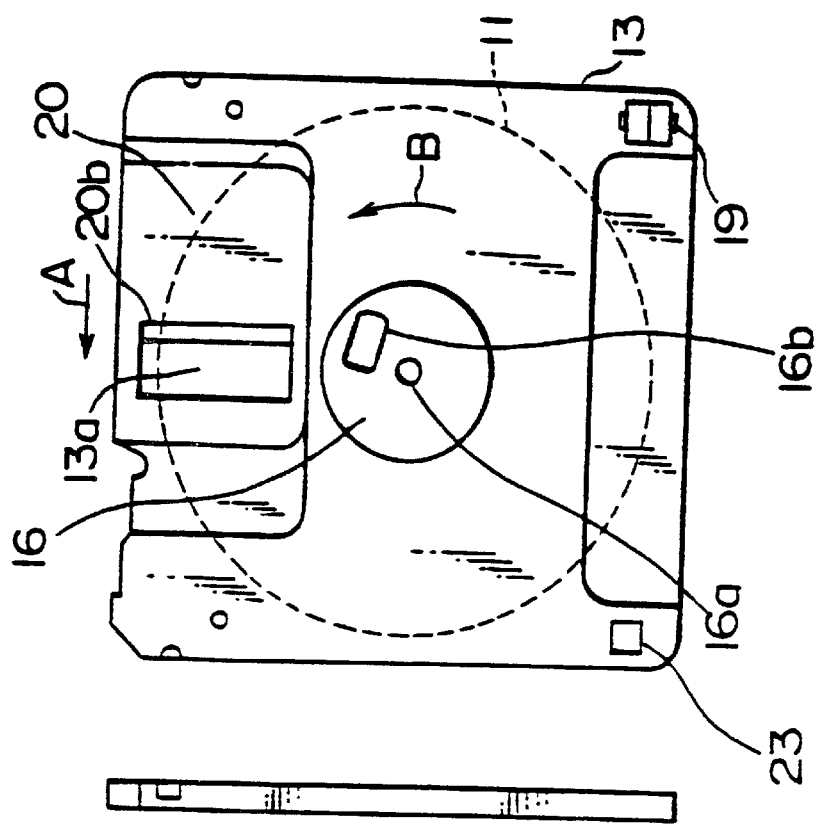
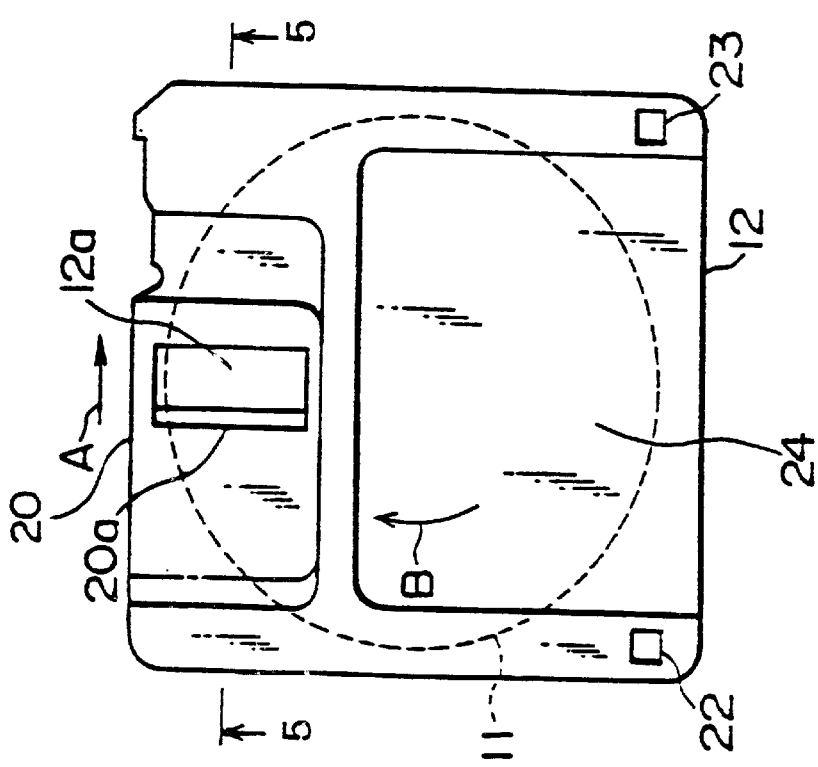
FIG. 3A PRIOR ART
FIG. 3B PRIOR ART
FIG. 3C PRIOR ART

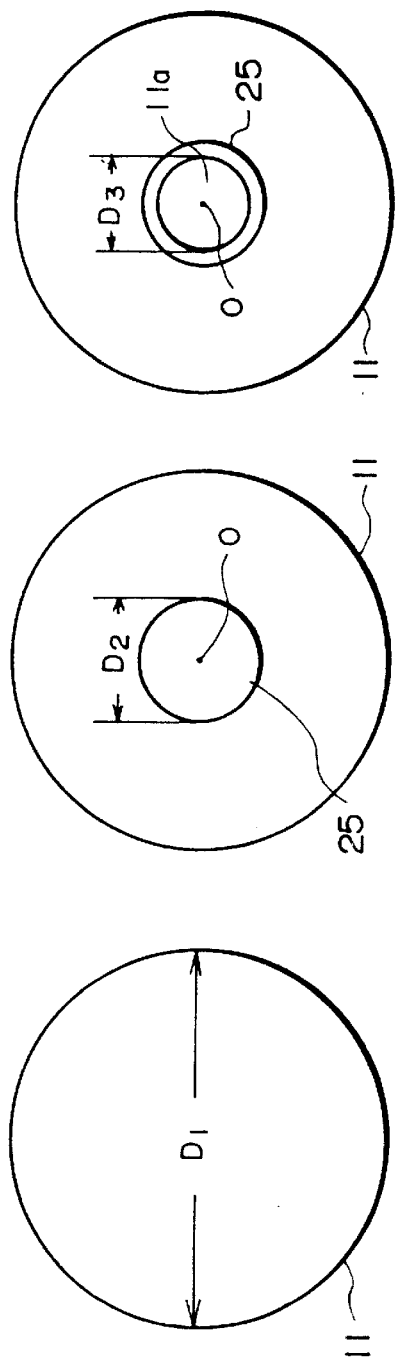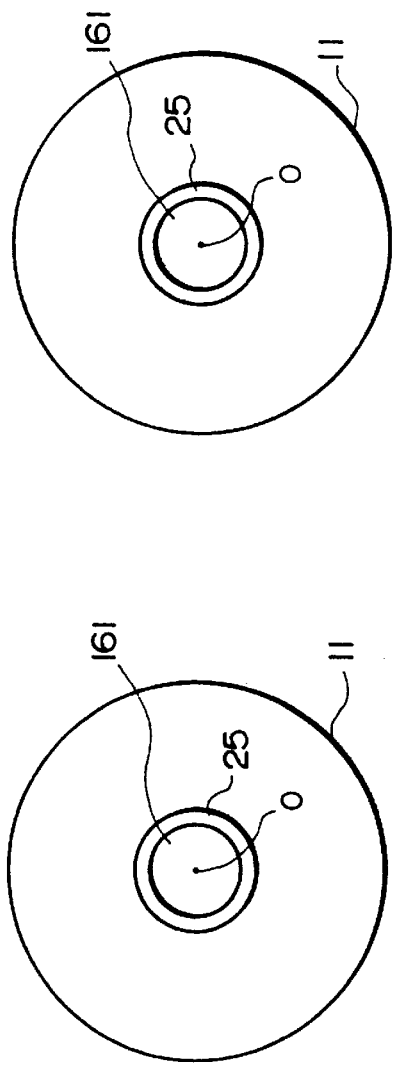

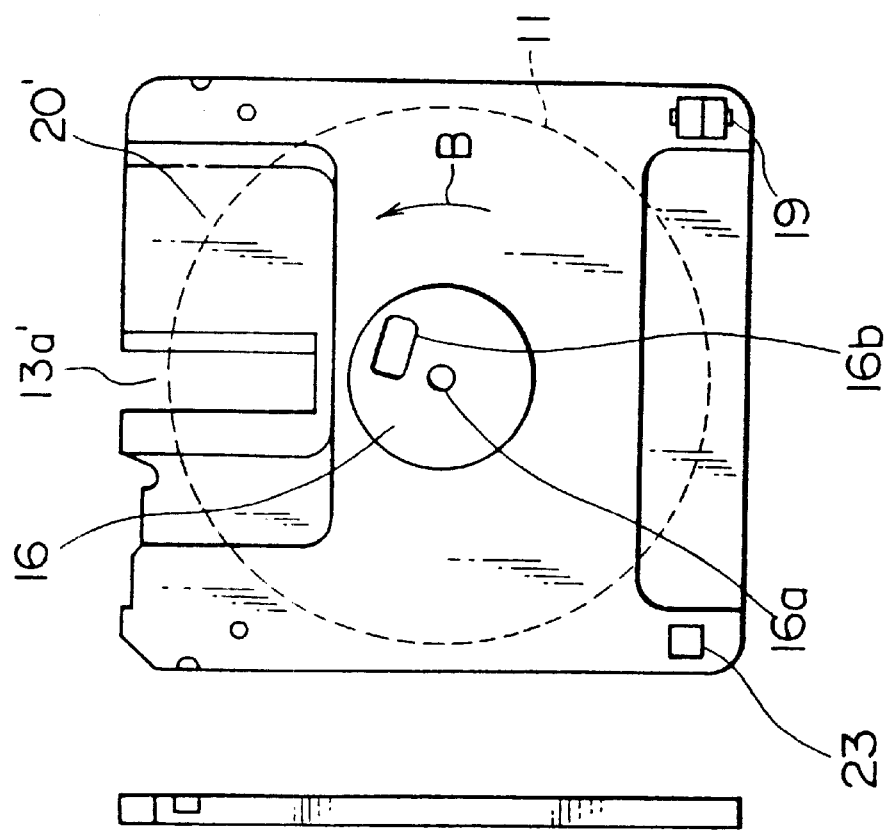
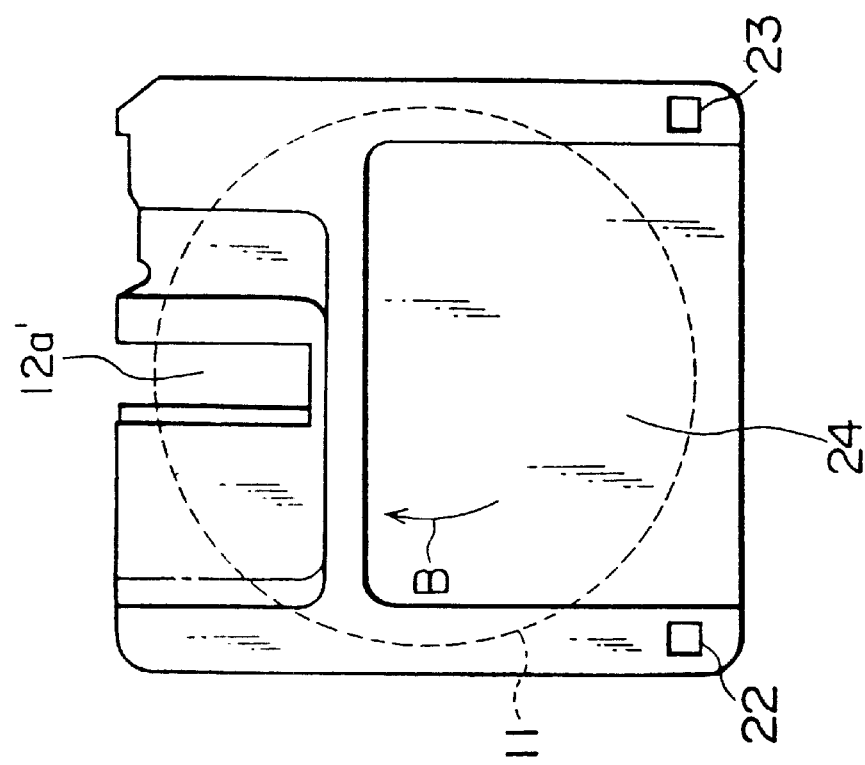
FIG. 14A  FIG. 14B  FIG. 14C

METHOD OF MAKING A DISK CARTRIDGE COMPRISING AN IMPROVED MAGNETIC DISK MEDIUM

This is a division of application Ser. No. 08/993,273 filed Dec. 18, 1997, now U.S. Pat. No. 6,130,806.

BACKGROUND OF THE INVENTION

This invention relates to a disk cartridge, such as a floppy disk, containing a magnetic disk medium and to a method of manufacturing the same.

A conventional disk cartridge comprises a magnetic disk medium and upper and lower shells forming a space to receive the magnetic disk medium. The upper and the lower shells are provided with upper and lower head windows, respectively, to permit access to the magnetic disk medium by a pair of magnetic heads. The magnetic disk medium is made of a magnetic material having flexibility. A liner is attached to an inner surface of each of the upper and the lower shells. The liner serves to remove fine dust attracted onto the surface of the magnetic disk medium. Therefore, the liner is preferably arranged as close as possible to the surface of the magnetic disk medium.

The conventional disk cartridge has a first problem in that the magnetic disk medium is readily wrinkled as will later be described in detail.

Furthermore, the conventional disk cartridge has go a second problem in that, if the liner is too close to the magnetic disk medium, a torque loss will be caused to reduce a torque for rotating the magnetic disk medium. With an increase in torque loss, data writing/reading operations upon the magnetic disk medium become unstable and unreliable.

On the other hand, an apparatus for accessing the disk cartridge described above by the use of magnetic heads is called a disk drive. The disk drive comprises a disk holder unit for receiving the disk cartridge, and upper and lower magnetic heads for accessing the magnetic disk medium through the upper and the lower head windows of the disk cartridge. The upper and the lower magnetic heads are held by a carriage assembly.

More specifically, the carriage assembly comprises upper and lower carriages. The upper and the lower carriages hold the upper and the lower magnetic heads at their top ends, respectively. If no disk cartridge is received in the disk drive, it is necessary to separate the upper magnetic head from the lower magnetic head. For this purpose, when no disk cartridge is received in the disk drive, an arm attached to the upper carriage is engaged with the disk holder unit so that the top end of the upper carriage is lifted up. It is noted here that the disk cartridge has a thickness of about 3.3 mm if it is a floppy disk. Therefore, in the conventional disk drive for the floppy disk, the top end of the upper carriage must be lifted up in a range between about 3.5 and 3.6 mm. Thus, in the disk drive for the disk cartridge, the upper magnetic head must be displaced over a distance greater than the thickness of the disk cartridge. For this purpose, a vertical movement mechanism for vertically moving the upper magnetic head is required. The vertical movement mechanism is subjected to a heavy load. Since the displacement of the upper magnetic head is relatively large, a head load pressure downwardly applied to the upper magnetic head is not stable. This third problem results from the structure of the disk cartridge.

SUMMARY OF THE INVENTION

It is therefore a first object of this invention to provide a disk cartridge capable of suppressing the occurrence of wrinkles on a magnetic disk medium.

It is a second object of this invention to provide a method of manufacturing a disk cartridge capable of suppressing the occurrence of wrinkles on a magnetic disk medium.

It is a third object of this invention to provide a disk cartridge capable of reducing a torque loss due to the presence of a liner so as to stably and reliably carry out writing/reading operations.

It is a fourth object of this invention to provide a disk cartridge capable of minimizing a vertical displacement of an upper magnetic head of a disk drive.

It is a fifth object of this invention to provide a disk cartridge capable of readily stabilizing head load pressure applied to an upper magnetic head of a disk drive.

A disk cartridge according to this invention comprises a magnetic recording medium which includes a magnetic disk medium having an annular shape with a circular opening formed at its center and a metal hub supporting the magnetic disk medium. The metal hub comprises a cylindrical portion fitted into the circular opening and a flange portion formed at the upper end of the cylindrical portion. A lower surface of the flange portion is adhered to an upper surface of the magnetic disk medium at the periphery of the circular opening.

According to a first aspect of this invention, the disk cartridge further comprises an annular reinforcing member adhered to a lower surface of the magnetic disk medium at the periphery of the circular opening.

A method of manufacturing a disk cartridge according to this invention comprises the steps of preparing a disk-shaped magnetic disk medium having a first diameter defined by a first center, preparing a disk-shaped reinforcing member having a second diameter smaller than the first diameter and defined by a second center, adhering the reinforcing member to the lower surface of the magnetic disk medium with the first and the second centers coincident with each other, removing a center portion of the magnetic disk medium with the reinforcing member adhered thereto to form a circular opening having a third diameter smaller than the second diameter, preparing a metal hub comprising a cylindrical portion having a fourth diameter smaller than the third diameter and a flange portion formed at the upper end of the cylindrical portion and having a fourth diameter greater than the third diameter, and fitting the cylindrical portion into the circular opening of the magnetic disk medium on the side of the upper surface thereof and adhering the lower surface of the flange portion and the upper surface of the magnetic disk medium at the periphery of the circular opening.

A disk cartridge according to this invention comprises a jacket body receiving a magnetic disk medium and having a head window permitting a magnetic head to access the magnetic disk medium, and upper and lower liners adhered to upper and lower inner surfaces of the jacket body, respectively, to remove fine dust attracted to the upper and the lower surfaces of the magnetic disk medium. A distance $h_0$ is kept between the upper and the lower liners.

According to a second aspect of this invention, a distance $h_1$ smaller than the distance $h_0$ is kept between the upper and the lower liners at the periphery of the circular opening at least on an upstream side of the head window with respect to a rotating direction of the magnetic disk medium.

A disk cartridge according to this invention comprises a jacket body receiving a magnetic disk medium and having upper and lower head windows permitting a pair of magnetic heads to access the magnetic disk medium, and a shutter for opening and closing the upper and the lower head windows. The jacket body comprises upper and lower shells.

According to a third aspect of this invention, the upper and the lower head windows are formed by upper and lower notches formed in the upper and the lower shells, respectively. The shutter has a shutter window for exposing the upper and the lower head windows. The shutter window is formed by cutting upper, lower, and front surfaces of the shutter at positions corresponding to the upper and the lower head windows.

BRIEF DESCRIPTION OF THE DRAWING

FIGS. 3A through 3C show an external appearance of the floppy disk illustrated in FIG. 1;

FIGS. 8A through 8E are views for describing a manufacturing process of the magnetic recording medium illustrated in FIG. 6 and its advantages;

FIGS. 14A through 14C show an external appearance of the disk cartridge illustrated in FIG. 13.

DESCRIPTION OF THE PREFERRED EMBODIMENTS

Figure 1:
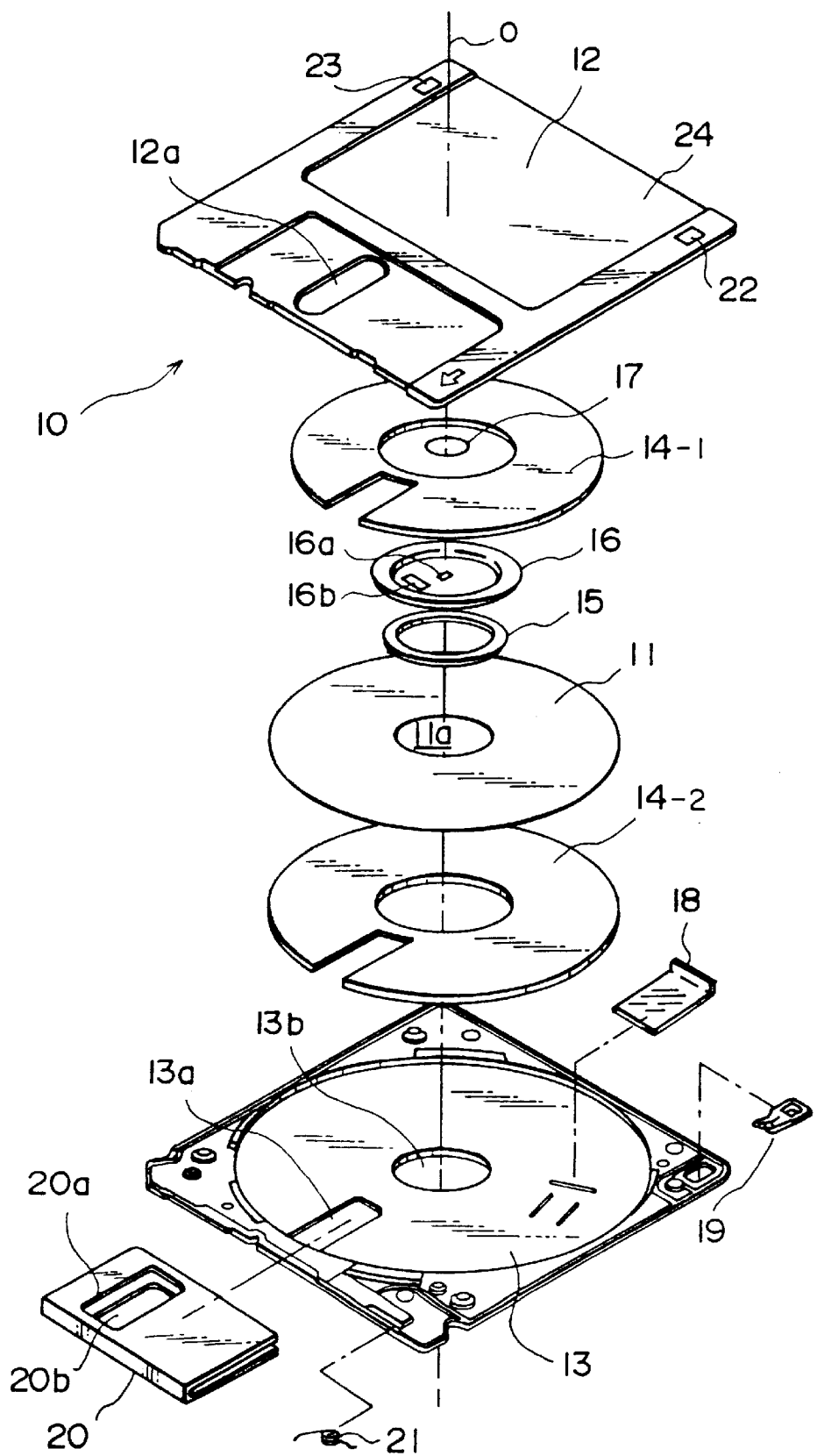
FIG. 1 is an exploded perspective view showing a structure of a 3.5-inch floppy disk as an example of a conventional disk cartridge.
Figure 2:
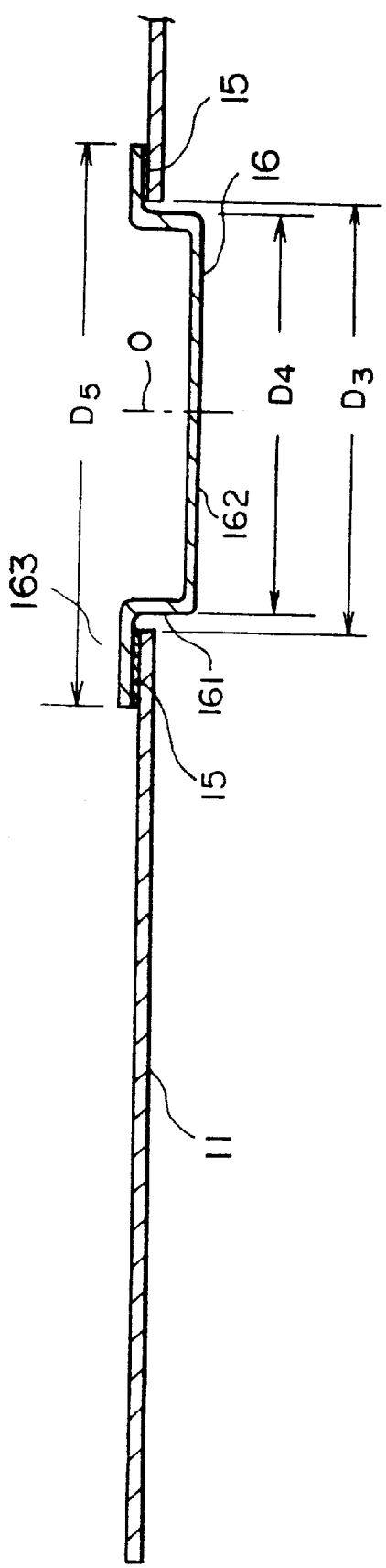
FIG. 2 is a sectional view of a part of a magnetic recording medium in the floppy disk illustrated in FIG. 1.

For a better understanding of this invention, description will at first be made about a conventional disk cartridge with reference to FIG. 1.

In the following, a 3.5-inch floppy disk will be described as an example of the disk cartridge. The floppy disk is disclosed in a Japanese book entitled "The Whole of Floppy Disk Apparatus" written by Shoji Takahashi and published by CQ Publishing Co., Ltd. on Jul. 10, 1990, page 160.

Referring to FIG. 1, the floppy disk depicted at 10 comprises a magnetic disk medium 11, an upper shell 12, a lower shell 13, an upper liner 14-1 adhered to an inner surface of the upper shell 12, and a lower liner 14-2 adhered to an inner surface of the lower shell 13. The magnetic disk medium 11 is received between the upper and the lower liners 14-1 and 14-2. Herein, a combination of the upper and the lower shells 12 and 13 will be called a jacket body. The magnetic disk medium 11 is received in the jacket body. The upper and the lower liners 14-1 and 14-2 serve to remove fine dust attracted to the surfaces of the magnetic disk medium 11. The jacket body is provided with a head window to enable an access by a pair of magnetic heads (not shown) of a disk drive. Specifically, the head window is composed of upper and lower head windows 12a and 13a as rectangular holes formed in the upper and the lower shells 12 and 13, respectively.

The magnetic disk medium 11 has an annular shape with a circular opening 11a formed at its center to be concentric with a center axis O of the magnetic disk medium 11. The magnetic disk medium 11 is supported at the periphery of the circular opening 11a by a metal hub 16 through a double-sided adhesive tape 15 called an A ring.

Referring to FIGS. 2 and 3A through 3C in addition, the metal hub 16 has a cylindrical portion 161 with a circular bottom 162, and a flange portion 163 formed at the upper end of the cylindrical portion 161. The cylindrical portion 161 has a diameter $D_4$ smaller than a diameter $D_3$ of the circular opening 11a. The flange portion 163 has a diameter $D_5$ greater than the diameter $D_3$ of the circular opening 11a. The cylindrical portion 161 is fitted into the circular opening 11a of the magnetic disk medium 11 to be concentric therewith. A lower surface of the flange portion 163 is adhered by the A ring 15 to an upper surface of the magnetic disk medium 11 at the periphery of the circular opening 11a. In the following description, a combination of the magnetic disk medium 11 and the metal hub 16 will be called a magnetic recording medium.

A center plate 17 is interposed between the metal hub 16 and the upper shell 12. To the lower shell 13, a lifter 18 and a write protector 19 are attached. The lifter 18 serves to press the lower liner 14-2 against the magnetic disk medium 11. The lower shell 13 is provided with a circular opening 13b which serves to expose the bottom 162 of the cylindrical portion 161 of the metal hub 16.

The floppy disk 10 further comprises a metal shutter 20 for opening and closing the upper and the lower head windows 12a and 13a. The shutter 20 is closed when the floppy disk 10 is not received in the disk drive. This prevents fine dust and various contaminants from entering into the jacket body and makes it difficult for an operator's finger to erroneously touch a recording surface of the magnetic disk medium 11. The shutter 20 has a shutter window for bringing the upper and the lower head windows 12a and 13a into an open state. Specifically, the shutter window has an upper shutter window 20a as a rectangular hole formed in an upper plate of the shutter 20 at a position corresponding to the upper head window 12a, and a lower shutter window 20b as a rectangular hole formed in a lower plate of the shutter 20 at a position corresponding to the lower head window 13a. The shutter 20 is urged by a shutter spring 21 attached to the lower shell 13 in a closing direction indicated by arrow A in FIG. 3A.

Referring to FIGS. 3A and 3C, the shutter 20 is slid against the urging force of the shutter spring 21 (FIG. 1) in a direction reverse to the closing direction A. In this state, the shutter 20 is in an open state to expose the upper and the lower head windows 12a and 13a.

The metal hub 16 serves to chuck the floppy disk 10 at a disk holding table of the disk drive. Specifically, the metal hub 16 has a center hole 16a formed at its center and a chucking hole 16b formed at a position eccentric with the center hole 16a. To the center hole 16a, a rotary shaft (not shown) of a motor (not shown) is inserted which is for rotating the magnetic disk medium 11 of the floppy disk 10 in a rotating direction indicated by arrow B in the figure. To the chucking hole 16b, a chucking pin (not shown) formed on the disk holding table is inserted.

The write protector 19, which is called a write protect tab, serves to switch opened/closed states of a write protect hole 22 formed in the jacket body to inhibit a writing operation. When the write protect hole 22 is closed and opened by moving the write protector 19, the floppy disk 10 is put into a write enable state and a write inhibit state, respectively. The jacket body is further provided with a hole 23 formed at a position symmetrical with the write protect hole 22 to identify the floppy disk as a high-density (HD) type. The upper shell 12 has a label area 24 formed on an upper surface thereof.

It is noted here that the floppy disk 10 illustrated in FIG. 1 has a normal storage capacity of 1 Mbyte or 2 Mbyte. A large-capacity floppy disk having a storage capacity of as large as 128 Mbyte does not include the lifter 18.

Figure 4A:
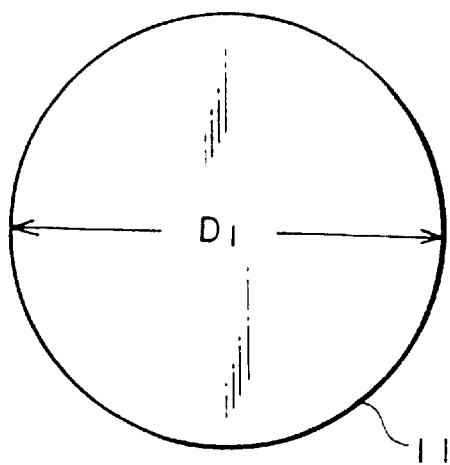
FIGS. 4A through 4D are views for describing a manufacturing process of the magnetic recording medium illustrated in FIG. 1 and its disadvantages.
Figure 4B:
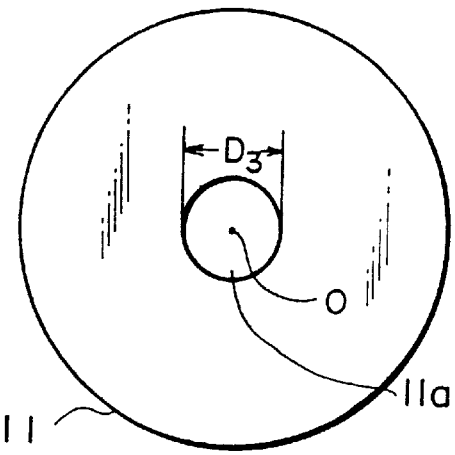
Figure 4C:
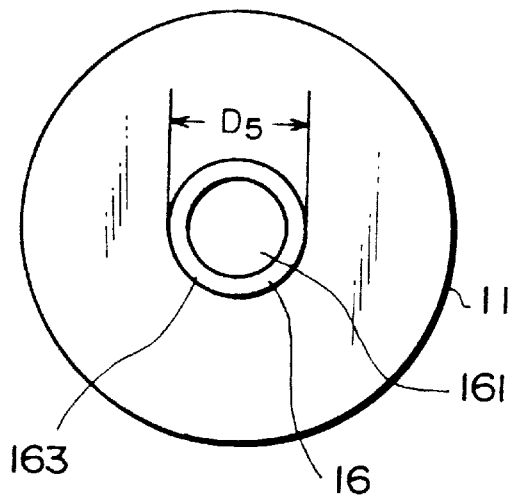

Referring also to FIGS. 4A through 4D, description will be made about a method of manufacturing the magnetic recording medium illustrated in FIG. 1. As illustrated in FIG. 4A, the magnetic disk medium 11 of a circular shape having a diameter $D_1$ is at first prepared. The magnetic disk medium 11 has a thickness of about 62 $\mu$m. Next, a center portion of the magnetic disk medium 11 is removed to form the circular opening 11a having the diameter $D_3$, as illustrated in FIG. 4B. The circular opening 11a has a center coincident with the center axis O. Then, as illustrated in FIG. 4C, the metal hub 16 is adhered to the upper surface of the magnetic disk medium 11 by the A ring 15. The metal hub 16 may be adhered to the magnetic disk medium 11 by the use of an adhesive instead of the A ring 15.

Figure 4D:
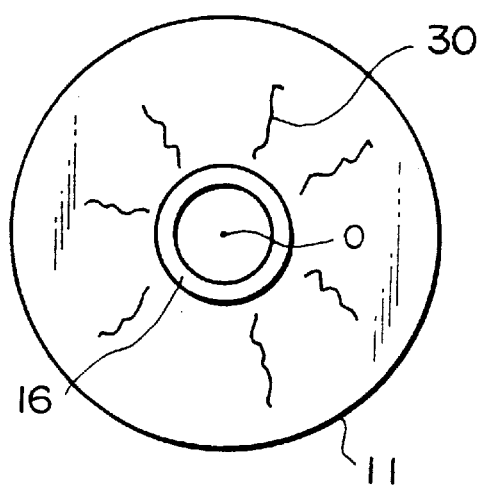

As described above, the magnetic recording medium illustrated in FIG. 1 is formed by adhering the magnetic disk medium 11 to the metal hub 16. Thus, only the upper surface of the magnetic disk medium 11 is supported by the metal hub 16. In other words, the magnetic disk medium 11 is supported only at its one surface. As a result, as illustrated in FIG. 4D, the magnetic disk medium 11 may suffer from the occurrence of wrinkles 30. When the magnetic head of the disk drive is brought into contact with the magnetic disk medium 11 for writing/reading operations, the contact (hereinafter called "head touch") becomes unstable in presence of such wrinkles 30. In this event, the magnetic head can not perform stable data writing/reading operations upon the magnetic disk medium 11. Such problem is particularly serious when the magnetic disk medium 11 is rotated at a high speed, for example, at 3600 rpm in case where the floppy disk has a large capacity. The above-mentioned problem will be referred to as a first problem.

Figure 5:
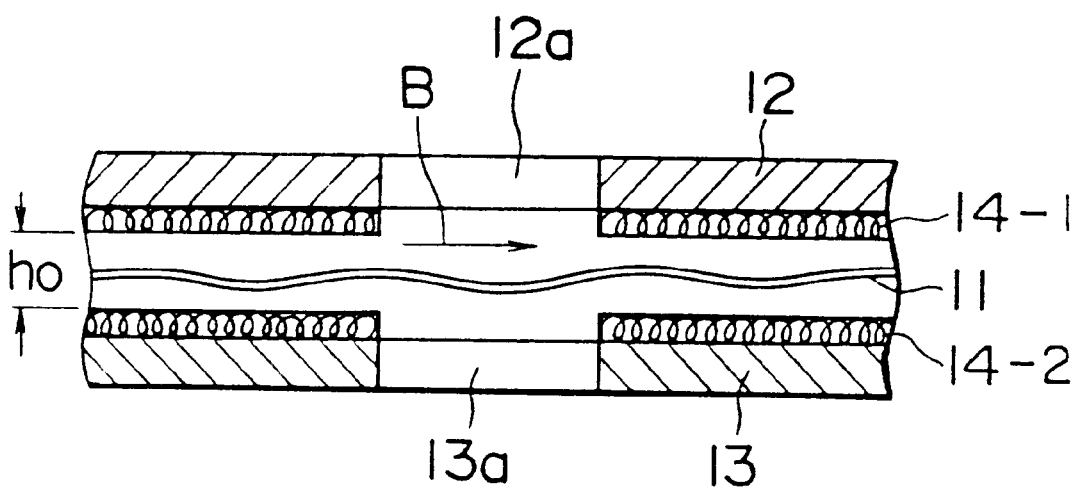
FIG. 5 is a sectional view taken along a line 5—5 in FIG. 3A.

Turning to FIG. 5, the distance between the upper and the lower liners 14-1 and 14-2 opposite to each other is uniform in the conventional floppy disk 10 and is depicted at $h_0$ in the figure. Specifically, each of the upper and the lower liners 14-1 and 14-2 has a uniform thickness while each of the inner surfaces of the upper and the lower shells 12 and 13 is flat in a region where the magnetic disk medium 11 is held. In FIG. 5, the shutter is omitted for simplicity of illustration.

In the conventional disk cartridge, namely, the floppy disk 10, the distance $h_0$ between the upper and the lower liners 14-1 and 14-2 is uniform as described above. If the distance ho is increased, the magnetic disk medium 11 is fluttered as illustrated in FIG. 5. Such fluttering is noticeable when the magnetic disk medium 11 is rotated at a high speed, for example, at 3600 rpm in case where the floppy disk has a large capacity. As a result, the head touch of the magnetic head of the disk drive to the magnetic disk medium 11 is not stable. Therefore, the data writing/reading operations upon the magnetic disk medium 11 can not be stably carried out. On the contrary, when the distance $h_0$ is reduced, the fluttering of the magnetic disk medium 11 is suppressed. However, due to friction between the magnetic disk medium 11 and each of the upper and the lower liners 14-1 and 14-2, a torque loss is caused to reduce a torque required in rotating the magnetic disk medium 11. Thus, the distance $h_0$ and the torque loss are in inverse proportion to each other.

As described above, the floppy disk 10 has a second problem in that, if the upper and the lower liners 14-1 and 14-2 are too close to the magnetic disk medium 11, the torque loss is caused to reduce the torque required in rotating the magnetic disk medium. With the increase of the torque loss, the data writing/reading operations upon the magnetic disk medium 11 become unstable.

As described before, the disk drive comprises the disk holder unit for receiving the disk cartridge, such as the floppy disk 10, the upper magnetic head for accessing the magnetic disk medium 11 through the upper head window 12a of the disk cartridge, and the lower magnetic head for accessing the magnetic disk medium 11 through the lower head window 13a of the disk cartridge. The upper and the lower magnetic heads are held by a carriage assembly.

More specifically, the carriage assembly comprises upper and lower carriages. The upper and the lower carriages hold the upper and the lower magnetic heads at their top ends, respectively. If no disk cartridge is received in the disk drive, it is necessary to separate the upper magnetic head from the lower magnetic head. For this purpose, when no disk cartridge is received in the disk drive, an arm attached to the upper carriage is engaged with the disk holder unit so that the top end of the upper carriage is lifted up. As described before, the disk cartridge has a thickness of about 3.3mm if it is a floppy disk. Therefore, in the disk drive for use with the floppy disk, the top end of the upper carriage must be lifted up by in a range between about 3.5 and 3.6 mm. Thus, in the disk drive for the floppy disk as the conventional disk cartridge, the upper magnetic head must be displaced over a range greater than the thickness of the floppy disk. For this purpose, a vertical movement mechanism for vertically moving the upper magnetic head is required. The vertical movement mechanism is subjected to a heavy load. Since the displacement of the upper magnetic head is relatively large, a head load pressure downwardly applied to the upper magnetic head is not stable. This third problem results from the structure of the disk cartridge.

Figure 6:
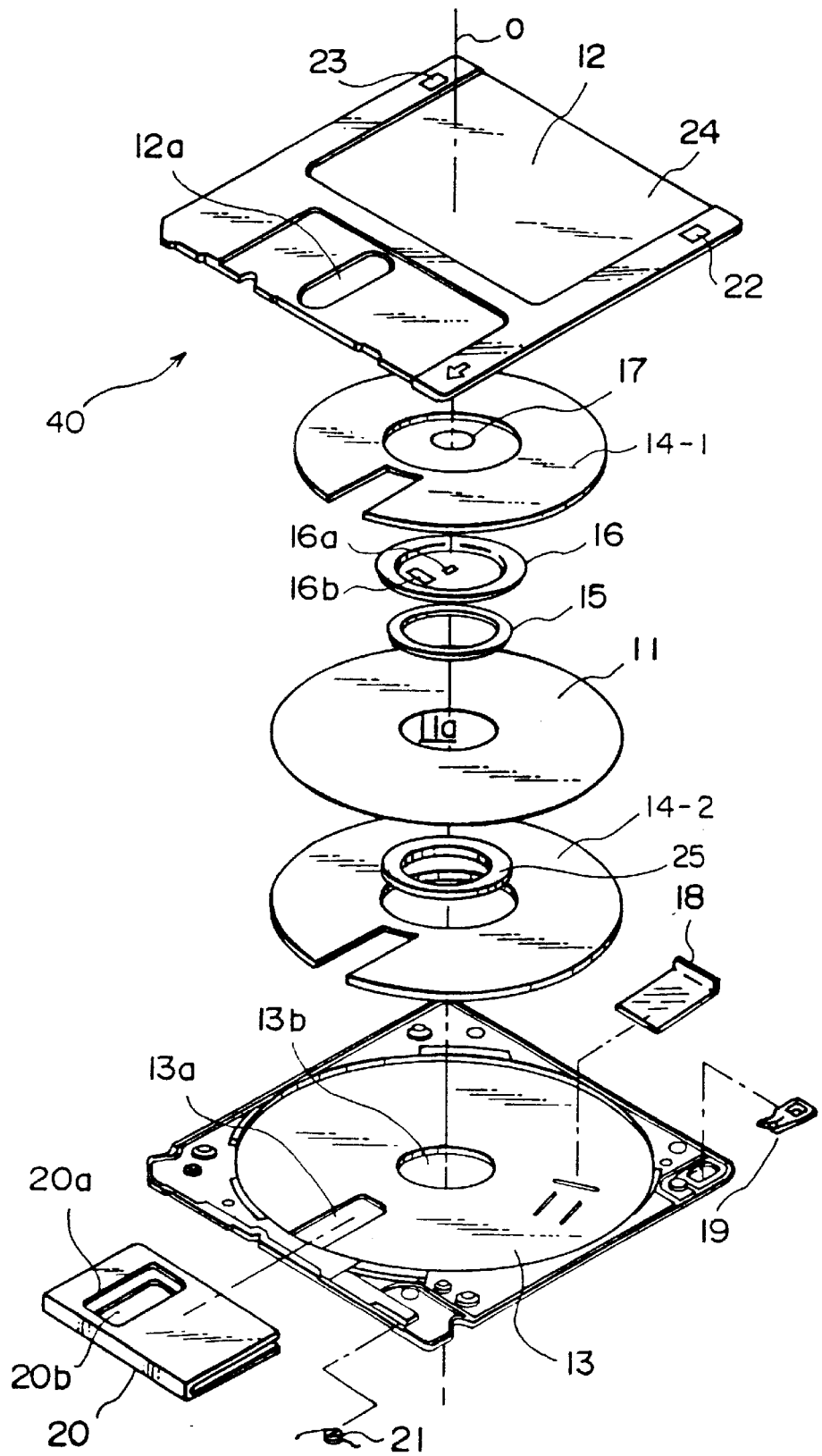
FIG. 6 is an exploded perspective view showing a structure of a disk cartridge according to a first embodiment of this invention.
Figure 7:
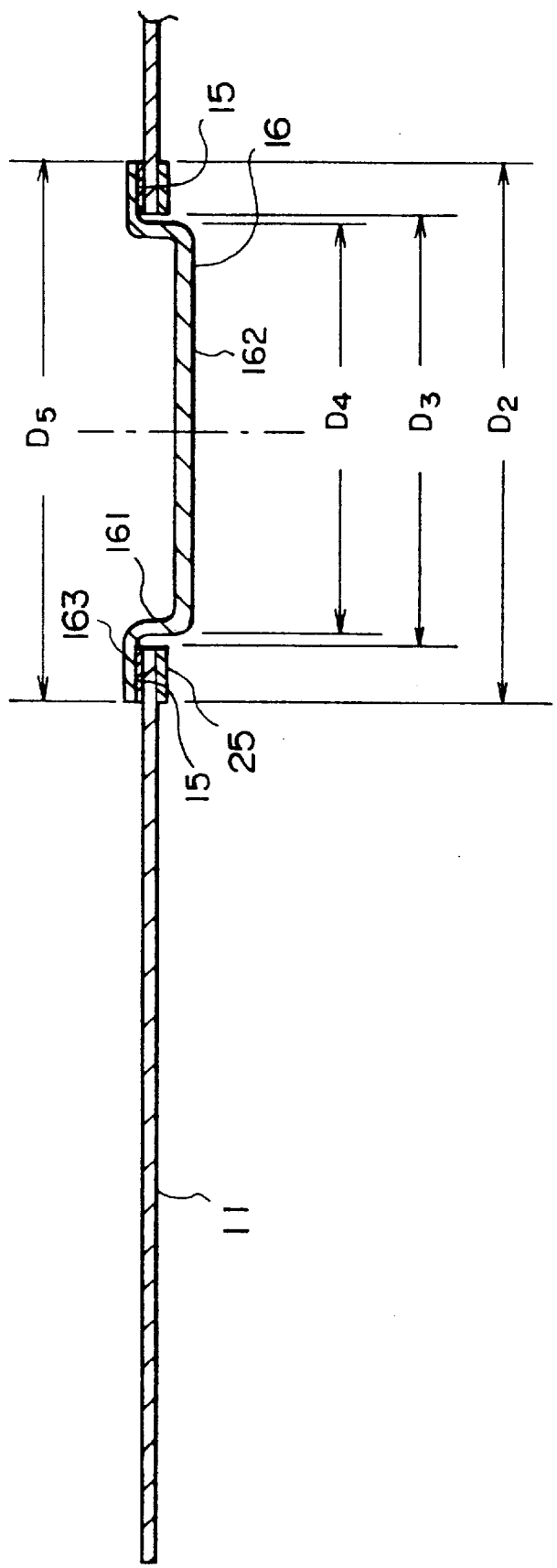
FIG. 7 is a sectional view of a part of a magnetic recording medium illustrated in FIG. 6.

Referring to FIGS. 6 and 7, a disk cartridge according to a first embodiment of this invention solves the above-mentioned first problem.

As illustrated in FIG. 6, the disk cartridge 40 according to the first embodiment of this invention is similar in structure to the disk cartridge, namely, the floppy disk 10 illustrated in FIG. 1 except that the disk cartridge 40 has an annular reinforcing member 25. Similar parts are designated by like reference numerals.

Referring to FIG. 7, the reinforcing member 25 is adhered to a lower surface of a magnetic disk medium 11 at the periphery of a circular opening 11a to suppress the occurrence of wrinkles on the magnetic disk medium 11. The reinforcing member 25 has a diameter $D_2$ greater than a diameter $D_3$ of the circular opening 11a of the magnetic disk medium 11 and is substantially equal to a diameter $D_5$ of a flange portion 163 of a metal hub 16 attached to an upper surface of the magnetic disk medium 11. The reinforcing member 25 is adhered to the magnetic disk medium 11 by the use of either an adhesive or an A ring similar to that depicted at 15 in FIG. 1.

As described above, the upper and the lower surfaces of the magnetic disk medium are supported by the metal hub 16 and the reinforcing member 25, respectively, so that the occurrence of wrinkles on the magnetic disk medium 11 can be suppressed.

Referring to FIGS. 8A through 8E in addition, description will be made about a method of manufacturing the disk cartridge 40 according to the first embodiment. As illustrated in FIG. 8A, the magnetic disk medium 11 of a circular shape having a first diameter $D_1$ is at first prepared. The magnetic disk medium 11 has a thickness of about 62 µm. Next, a disk-shaped reinforcing member 25' having the diameter $D_2$ smaller than the first diameter $D_1$ is adhered to the lower surface of the magnetic disk medium 11, as illustrated in FIG. 8B. The diameter $D_2$ will be called a second diameter hereinafter. The reinforcing member 25' has a center coincident with a center axis O. The adhesion is carried out by the use of the adhesive or the A ring as described above. The reinforcing member 25' may comprise a metal plate or a resin sheet plate. Then, as illustrated in FIG. 8C, a center portion of the magnetic disk medium 11 with the reinforcing member 25' adhered thereto is removed together with a center portion of the reinforcing member 25' to form the circular opening 11a. The circular opening 11a has a center coincident with the center axis O and has a third diameter $D_3$ smaller than the second diameter $D_2$. As a consequence, the annular reinforcing member 25 is adhered to the lower surface of the magnetic disk medium 11. Subsequently, as illustrated in FIG. 8D, the metal hub 16 is adhered to the upper surface of the magnetic disk medium 11 by the use of the A ring 15 or the adhesive. Specifically, a cylindrical portion 161 of the metal hub 16 is fitted into the circular opening 11a of the magnetic disk medium 11. Then, the flange portion 163 of the metal hub 16 is adhered to the upper surface of the magnetic disk medium 11 at the periphery of the circular opening 11a.

As described above, both surfaces of the magnetic disk medium 11 are supported by the metal hub 16 and the reinforcing member 25, respectively, so that the occurrence of the wrinkles in the magnetic disk medium 11 is suppressed, as illustrated in FIG. 8E.

The disk cartridge according to this embodiment is not only applicable to a 3.5-inch floppy disk but also to any other disk cartridge. Also, the method of manufacturing the disk cartridge is not restricted to that descried above but may be any other appropriate method as far as the both surfaces of the magnetic disk medium 11 are eventually supported by the metal hub 16 and the reinforcing member 25.

Figure 9:
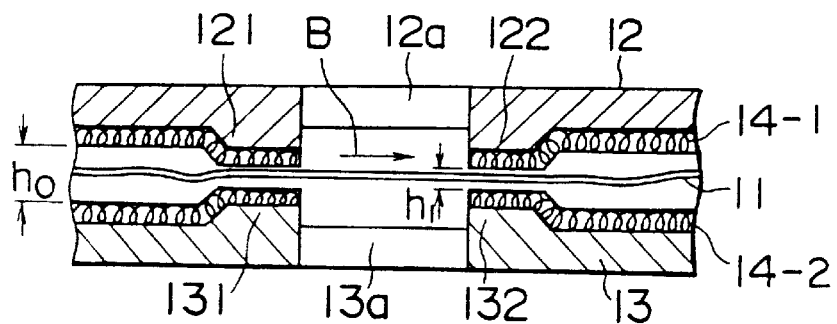
FIG. 9 is a sectional view of a main portion of a disk cartridge according to a second embodiment of this invention.

Referring to FIG. 9, a disk cartridge according to a second embodiment of this invention is intended to solve the above-mentioned second problem. The disk cartridge according to the second embodiment is similar to the floppy disk 10 illustrated in FIG. 1 except that upper and lower shells 12 and 13 are different in shape from those illustrated in FIGS. 1 and 5.

In the second embodiment, the distance between upper and lower liners 14-1 and 14-2 is not uniform. Specifically, the upper and the lower liners 14-1 and 14-2 has a smaller distance $h_1$ at peripheries of upper and lower head windows 12a and 13a and a greater distance $h_0$ in a remaining area. Such nonuniform distance is achieved in the following manner.

The upper shell 12 has protrusions 121 and 122 protruding towards the magnetic disk medium 11. The protrusions 121 and 122 are formed on an inner surface of the upper shell 12 at positions adjacent to a pair of opposite edges of the upper head window 12a of a rectangular shape which are perpendicular to tracks on the magnetic disk medium 11. Likewise, the lower shell 13 has protrusions 131 and 132 protruding towards the magnetic disk medium 11. The protrusions 131 and 132 are formed on an inner surface of the lower shell 13 at positions adjacent to a pair of opposite edges of the lower head window 13a of a rectangular shape which are perpendicular to the tracks on the magnetic disk medium 11.

In the second embodiment, only the distance $h_1$ at the peripheries of the upper and the lower head windows 12a and 13a is reduced as compared with the distance $h_0$ in the remaining area. It is therefore possible to suppress fluttering of the magnetic disk medium 11 around the upper and the lower head windows 12a and 13a without increasing the torque loss. Thus, the head touch of the magnetic head to the magnetic disk medium 11 is stable so that data writing/reading operations upon the magnetic disk medium 11 can be stably carried out.

Figure 10:
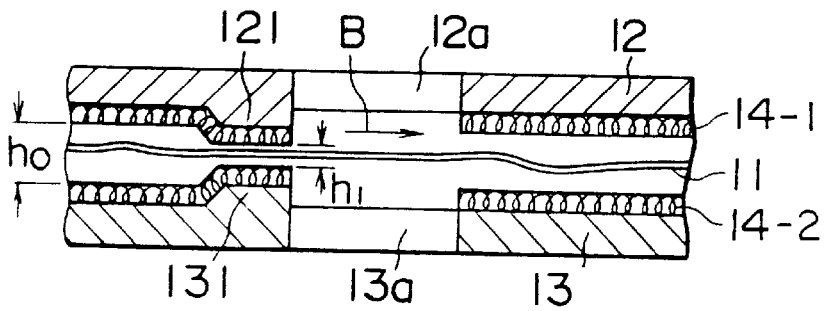
FIG. 10 is a sectional view of a first modification of the disk cartridge illustrated in FIG. 9.

Referring to FIG. 10, description will be made about a first modification of the disk cartridge illustrated in FIG. 9. The first modification of the disk cartridge is similar to that illustrated in FIG. 9 except that the protrusions 122 and 132 are removed. Specifically, the upper shell 12 has only one protrusion 121 protruding from the inner surface thereof towards the magnetic disk medium 11 at a position adjacent to an upstream edge of the upper head window 12a of the rectangular shape. Likewise, the lower shell 13 has only one protrusion 131 protruding from the inner surface thereof towards the magnetic disk medium 11 at a position adjacent to an upstream edge of the lower head window 13a of the rectangular shape. It is noted here that the upstream edge is one of a pair of edges perpendicular to the tracks on the magnetic disk medium 11 and is located up stream with respect to a rotating direction B of the magnetic disk medium 11.

The first modification of the above-mentioned structure obviously has an effect similar to that described in conjunction with the second embodiment.

Figure 11:
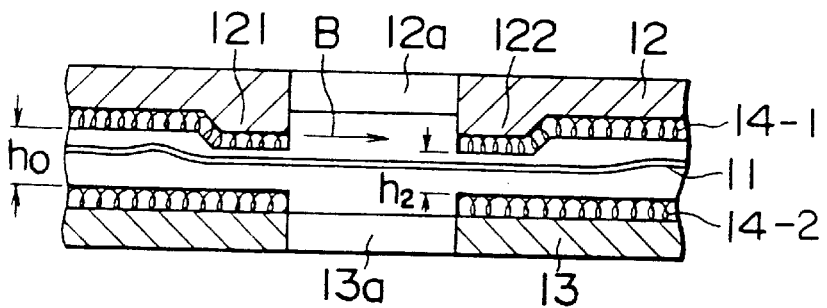
FIG. 11 is a sectional view of a second modification of the disk cartridge illustrated in FIG. 9.

Referring to FIG. 11, description will be made about a second modification of the disk cartridge illustrated in FIG. 9. The second modification of the disk cartridge is similar to that illustrated in FIG. 9 except that the protrusions 131 and 132 are omitted. Specifically, the upper shell 12 has the protrusions 121 and 122 protruding from the inner surface thereof towards the magnetic disk medium 11 at the positions adjacent to a pair of opposite edges of the upper head window 12a of the rectangular shape which are perpendicular to the tracks on the magnetic disk medium 11. On the other hand, the lower shell 13 has a structure similar to that of the conventional disk cartridge without no protrusions.

In the second modification, a distance $h_2$ at the peripheries of the upper and the lower head windows 12a and 13a is smaller than the distance $h_0$ in the remaining area. The second modification of the above-mentioned structure obviously exhibits an effect similar to that described in conjunction with the second embodiment.

Figure 12:
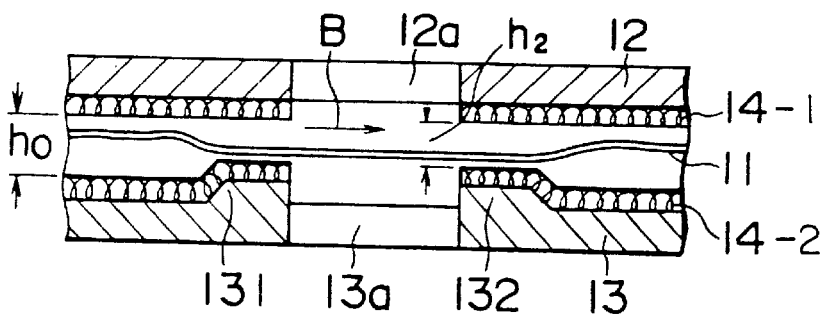
FIG. 12 is a sectional view of a third modification of the disk cartridge illustrated in FIG. 9.

Referring to FIG. 12, description will be made about a third modification of the disk cartridge illustrated in FIG. 9. The third modification of the disk cartridge is similar to that illustrated in FIG. 9 except that the protrusions 121 and 122 are omitted. Specifically, the lower shell 13 has the protrusions 131 and 132 protruding from the inner surface thereof towards the magnetic disk medium 11 at the positions adjacent to a pair of opposite edges of the lower head window 13a of the rectangular shape which are perpendicular to the tracks on the magnetic disk medium 11. On the other hand, the upper shell 12 has a structure similar to that of the conventional disk cartridge without no protrusions.

In the third modification, the distance $h_2$ at the peripheries of the upper and the lower head windows 12a and 13a is smaller than the distance $h_0$ in the remaining area. The third modification of the above-mentioned structure obviously exhibits an effect similar to that described in conjunction with the second embodiment.

Again, the disk cartridge according to this embodiment is not only applicable to a 3.5-inch floppy disk but also to any other disk cartridge.

Figure 13:
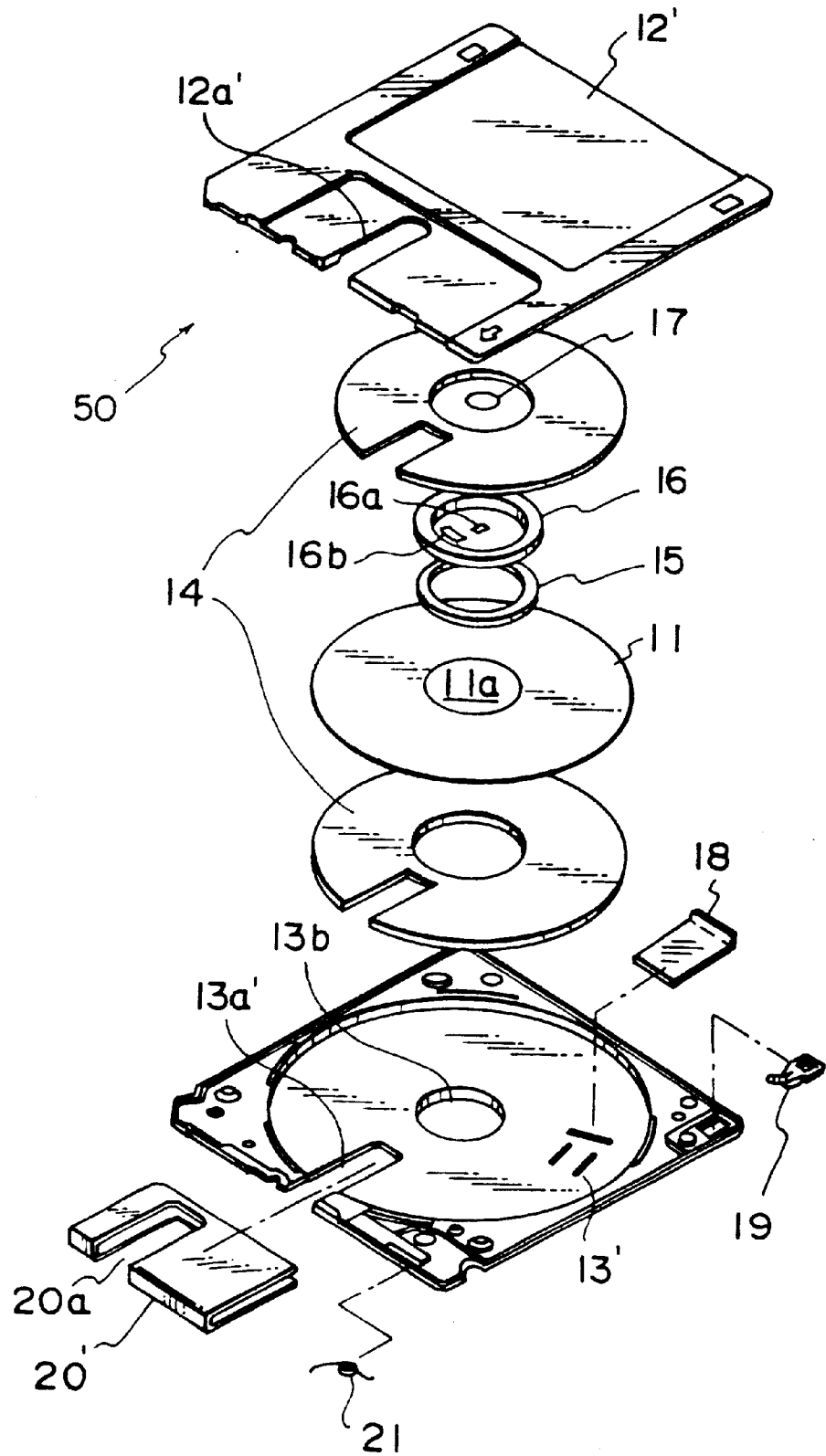
FIG. 13 is an exploded perspective view showing a structure of a disk cartridge according to a third embodiment of this invention.

Referring to FIGS. 13, and 14A, though 14C, a disk cartridge according to a third embodiment of this invention will be described in conjunction with a 3.5-inch floppy disk. In FIG. 13, the floppy disk depicted at 50 is similar in structure to that illustrated in FIG. 1 except that an upper shell 12', a lower shell 13', and a shutter 20' have different shapes. Specifically, in the third embodiment, a head window formed in a jacket body is a combination of upper and lower notches 12a' and 13a' formed in the upper and the lower shells 12' and 13', respectively. The shutter 20' has a shutter window 20a' formed by cutting upper, lower, and front surfaces of the shutter 20' at positions corresponding to the head window.

In contrast to the conventional head window which is a hole, the head window of the third embodiment is a notch. Likewise, the conventional shutter window is a hole while the shutter window of the third embodiment is a notch.

With this structure, when the floppy disk 50 is inserted or ejected into and from the disk drive, vertical displacement of the upper magnetic head of the disk drive is minimized. This is because the head window for permitting an access to a magnetic disk medium 11 by the upper magnetic head is not a hole but is cut away. In this event, the vertical displacement of the upper magnetic head can be reduced to a value slightly greater than a maximum range of vertical movement of the magnetic disk medium 11 having a small thickness. The maximum range of vertical movement of the magnetic disk medium 11 is approximately equal to 1 mm which substantially corresponds to ⅓ of the thickness (about 3.3 mm) of thee floppy disk 50.

Thus, the vertical displacement of the upper magnetic head can be reduced as compared with the conventional disk cartridge. As a result, an access to the magnetic disk medium 11 is enabled by minimum vertical movement of the upper magnetic head without heavy load applied upon the vertical movement mechanism for vertically moving the upper magnetic head. In addition, it is possible to simplify a spring mechanism of a head supporting portion holding the upper magnetic head. Since the vertical displacement of the upper magnetic head is small, the head load pressure upon the upper magnetic head can readily be rendered stable. Since the shutter window 20a' of the shutter 20' is opened in a direction of carriage motion, the magnetic head can be reduced in height. This structure is advantageous in view of a high-speed access and vibration characteristics.

In the third embodiment described above, both the head window and the shutter window are formed as the notches. This means that the upper and the lower shells 12' and 13' and the shutter 20' are slightly decreased in mechanical strength as compared with those of the conventional disk cartridge. It is therefore desired to provide a reinforcing portion to increase the mechanical strength.

Figure 15:
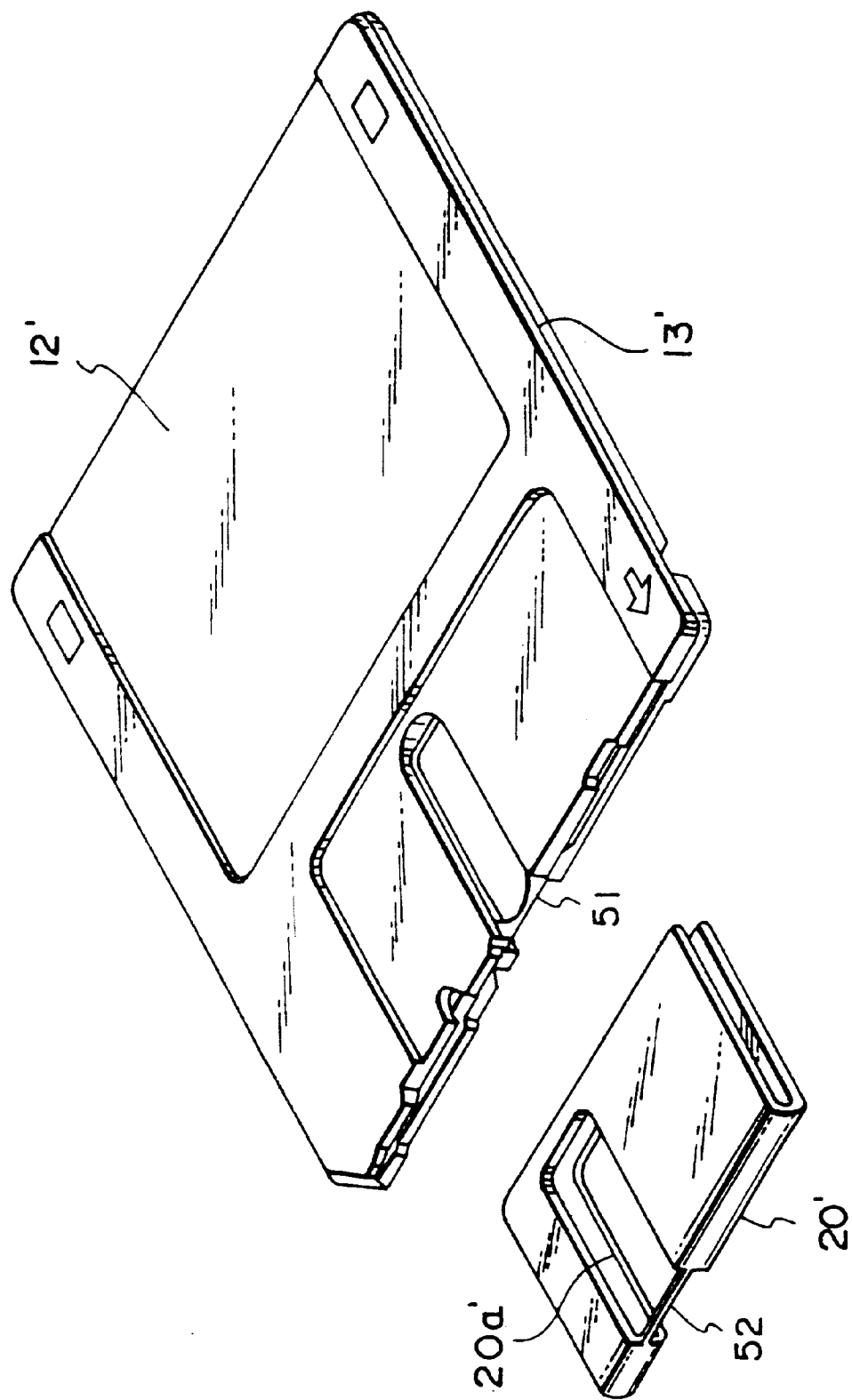
FIG. 15 is a partially exploded perspective view of a modification of the disk cartridge illustrated in FIG. 13.

Referring to FIG. 15, a modification of the disk cartridge with such reinforcing portion will be described. In FIG. 15, the jacket body comprises a reinforcing member 51 interposed between the upper and the lower shells 12' and 13' at a front end of the head window and extending to close the head window. The reinforcing member 51 comprises a thin metal plate. Likewise, the shutter 20' has a shutter reinforcing portion 52 formed at a front end of the shutter window and extending to close the shutter window. The shutter reinforcing member 52 has a thickness substantially equal to ⅓ of that of the jacket body. This is because the maximum range of vertical movement of the magnetic disk medium 11 is substantially equal to ⅓ of the thickness, of the floppy disk 50 as described above.

Again, the third embodiment is not only applicable to a 3.5-inch floppy disk but also to any other disk cartridge.

What is claimed is:

1. A method of manufacturing a disk cartridge, comprising the steps of:

preparing a disk-shaped magnetic disk medium having a first diameter defined by a first center;

preparing a disk-shaped reinforcing member having a second diameter smaller than the first diameter and defined by a second center;

adhering said reinforcing member to the lower surface of said magnetic disk medium with said first and said second centers coincident with each other;

removing a center portion of said magnetic disk medium with said reinforcing member adhered thereto to form a circular opening having a third diameter smaller than the second diameter;

preparing a metal hub comprising a cylindrical portion having a fourth diameter smaller than the third diameter and a flange portion formed at the upper end of said cylindrical portion and having a fifth diameter greater than the third diameter; and fitting said cylindrical portion into said circular opening of said magnetic disk medium on the side of the upper surface thereof and adhering-the lower surface of said flange portion and the upper surface of said magnetic disk medium at the periphery of said circular opening.

* * * * *